US012767592B2

(12) United States Patent
Lee et al.

(10) Patent No.: US 12,767,592 B2
(45) Date of Patent: Oct. 20, 2026

(54) METHOD FOR MANUFACTURING WINDOW

(71) Applicant: SAMSUNG DISPLAY CO., LTD., Yongin-si (KR)

(72) Inventors: Hoikwan Lee, Suwon-si (KR); Minki Kim, Hwaseong-si (KR); Byeong-Beom Kim, Asan-si (KR); Seungho Kim, Asan-si (KR); Yuri Kim, Guri-si (KR); Jonghoon Yeum, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 578 days.

(21) Appl. No.: 17/298,505

(22) PCT Filed: Apr. 23, 2019

(86) PCT No.: PCT/KR2019/004926
§ 371 (c)(1),
(2) Date: May 28, 2021

(87) PCT Pub. No.: WO2020/141656
PCT Pub. Date: Jul. 9, 2020

(65) Prior Publication Data

US 2022/0017411 A1 Jan. 20, 2022

(30) Foreign Application Priority Data

Jan. 4, 2019 (KR) ........................ 10-2019-0000995

(51) Int. Cl.
*C03C 21/00* (2006.01)
*C03C 3/083* (2006.01)
(Continued)

(52) U.S. Cl.
CPC ............ *C03C 21/002* (2013.01); *C03C 3/083* (2013.01); *C03C 3/097* (2013.01); *C03C 17/002* (2013.01); *C03C 2218/119* (2013.01)

(58) Field of Classification Search
None
See application file for complete search history.

(56) References Cited

U.S. PATENT DOCUMENTS 3,485,702 A 12/1969 Mochel
3,773,489 A 11/1973 Forker, Jr. et al.
(Continued)

FOREIGN PATENT DOCUMENTS

CN 103781739 5/2014
CN 104640821 5/2015
(Continued)

OTHER PUBLICATIONS

CN-108658453-A—EPO Machine Translation retrieved Nov. 14, 2023. (Year: 2023).*
(Continued)

*Primary Examiner* — Lisa L Herring
(74) *Attorney, Agent, or Firm* — F. CHAU & ASSOCIATES, LLC

(57) ABSTRACT

A method for manufacturing a window includes providing a base glass, and strengthening the base glass by exposing the base glass to a strengthening molten salt and an additive. The additive contains at least one of $Al_2(SO_4)_3$, $Al(NO_3)_3$, $K_2SiO_3$, $Na_2SiO_3$, KCl, $Ca(NO_3)_2$, and $Mg(NO_3)_2$, and a window having good surface compressive stress and excellent surface chemical resistance may thus Ire provided.

16 Claims, 13 Drawing Sheets

(51) Int. Cl.
*C03C 3/097* (2006.01)
*C03C 17/00* (2006.01)

(56) References Cited

U.S. PATENT DOCUMENTS

| | | | | |
|---|---|---|---|---|
| 4,015,045 | A | 3/1977 | Rinehart | |
| 8,413,464 | B2 | 4/2013 | Iwata et al. | |
| 9,884,784 | B2 | 2/2018 | Kashima et al. | |
| 10,308,549 | B2 | 6/2019 | Kashima et al. | |
| 10,696,585 | B2 * | 6/2020 | Lee | C03C 21/002 |
| 11,053,162 | B2 | 7/2021 | Andrews et al. | |
| 11,059,744 | B2 | 7/2021 | Oram et al. | |
| 2013/0133745 | A1 | 5/2013 | Hamilton | |
| 2014/0178691 | A1 | 6/2014 | Kreski | |
| 2016/0251262 | A1 * | 9/2016 | Gomez | C03C 21/001 65/30.14 |
| 2017/0022092 | A1 * | 1/2017 | DeMartino | G06F 1/1656 |
| 2017/0183255 | A1 | 6/2017 | Walther et al. | |
| 2017/0183256 | A1 | 6/2017 | Walther et al. | |
| 2018/0037497 | A1 * | 2/2018 | Lee | C03C 21/002 |
| 2018/0251400 | A1 * | 9/2018 | Bookbinder | C03B 23/0307 |
| 2018/0273422 | A1 | 9/2018 | Hori et al. | |
| 2018/0297892 | A1 | 10/2018 | Lee et al. | |
| 2019/0177215 | A1 | 6/2019 | Jin et al. | |
| 2019/0367410 | A1 * | 12/2019 | Jin | C03C 21/002 |
| 2019/0389764 | A1 * | 12/2019 | Andrews | C03C 10/0018 |
| 2020/0095162 | A1 * | 3/2020 | Jin | C03C 21/002 |
| 2020/0095163 | A1 * | 3/2020 | Luo | C03C 21/005 |
| 2020/0102244 | A1 * | 4/2020 | Li | C03C 21/002 |
| 2020/0148591 | A1 * | 5/2020 | Andrews | C03C 4/20 |
| 2020/0369560 | A1 * | 11/2020 | Takeda | B32B 7/025 |
| 2021/0094871 | A1 * | 4/2021 | Hu | C03C 4/18 |
| 2022/0388902 | A1 * | 12/2022 | Lee | C03C 23/007 |
| 2023/0312411 | A1 * | 10/2023 | An | C03C 21/002 65/30.14 |

FOREIGN PATENT DOCUMENTS

| | | | | |
|---|---|---|---|---|
| CN | 106715349 | | 5/2017 | |
| CN | 107428583 | A * | 12/2017 | B32B 17/06 |
| CN | 108383398 | | 8/2018 | |
| CN | 108658453 | A * | 10/2018 | |
| CN | 109415250 | | 3/2019 | |
| CN | 109661381 | | 4/2019 | |
| JP | S474191 | | 2/1972 | |
| JP | S4722418 | | 7/1972 | |
| JP | 2001226137 | | 8/2001 | |
| JP | 2008108412 | | 5/2008 | |
| JP | 2011213576 | | 10/2011 | |
| JP | 5094303 | | 12/2012 | |
| JP | 2013067555 | | 4/2013 | |
| JP | 2017529305 | | 10/2017 | |
| KR | 10-182190 | | 1/2018 | |
| KR | 10-1821901 | | 1/2018 | |
| WO | WO 2012141310 | | 10/2012 | |
| WO | WO2015/008763 | | 1/2015 | |
| WO | 2015100565 | | 7/2015 | |
| WO | 2017094727 | | 6/2017 | |
| WO | WO 2018143991 | | 8/2018 | |
| WO | WO-2020008901 | A1 * | 1/2020 | C03C 3/087 |

OTHER PUBLICATIONS

CN-107428583-A Machine Translation by Clarivate Analytics retrieved Apr. 14, 2025. (Year: 2025).*

WO-2020008901-A1 Machine Translation by Clarivate Analytics retrieved Jan. 23, 2026. (Year: 2026).*

Extended European Search Report Dated Sep. 30, 2022 For Application Serial No. 19906907.1.

* cited by examiner

METHOD FOR MANUFACTURING WINDOW

CROSS-REFERENCE TO RELATED APPLICATIONS

This U.S. non-provisional patent application is a National Stage Application of International Patent Application PCF/KR2012/004926, filed on Apr. 23, 2019, which claims priority to Korean Patent Application No. 10-2019-0000995, filed on Jan. 4, 2019, the entire contents of which are hereby incorporated by reference.

TECHNICAL FIELD

The present invention relates to a method for manufacturing a window, and more particularly, to a method for manufacturing a window used as a cover glass of an electronic device.

DISCUSSION OF THE RELATED ART

Electronic devices include windows, housings, and electronic elements Hie electronic elements may include various types of elements activated in response to electrical signals, such as display elements, touch elements, or detection elements.

The windows protect the electronic elements and provide active areas to users. Accordingly, the users provide inputs to the electronic elements or receive information generated in the electronic elements through the windows. In addition, the electronic elements may be stably protected from external shocks through the windows.

In line with the current trend for slimness in electronic devices, the windows are also required to be light and thin, and, in an effort to overcome the resulting structural vulnerability, ways to strengthen the windows to be provided with excellent strength and surface durability are being studied.

SUMMARY

A method for manufacturing a window includes providing a base glass. The base glass is exposed to a mixed melt including a strengthening molten salt and an additive. The additive includes $Al_2(SO_4)_3$, $Al(NO_3)_3$, $K_2SiO_3$, $Na_2SiO_3$, KCl, $Ca(NO_3)_2$, and/or $Mg(NO_3)_2$.

The additive may be included in the mixed melt an amount of 0 wt % to 10 wt % with respect to a total weight of the mixed melt.

The additive may be $Al_2(SO_4)_3$ or $Al(NO_3)_3$.

The base glass may include $SiO_2$, $Al_2O_3$, and $Li_2O$.

The base glass may further include $P_2O_5$.

The base glass may include $SiO_2$ in an amount of 50 wt % to 80 wt %, $Al_2O_3$ in an amount of 10 wt % to 30 wt %, and $Li_2O$ in an amount of 3 wt % to 20 wt %.

The base glass may include $SiO_2$, $Al_2O_3$, and $P_2O_5$.

The strengthening molten salt may be a mixed salt including two or more ions selected from the group consisting of $Li^+$, $Na^+$, $K^+$, $Rb^+$ and $Cs^+$, or a single salt containing any one ion selected from the group consisting of $Li^+$, $Na^+$, $K^+$, $Rb^+$ and $Cs^+$.

The step of exposing the base glass to the mixed melt may include exposing the base glass to a first strengthening molten salt and the additive to strengthen the base glass, and exposing the base glass to a second strengthening molten salt, without exposing the base glass to the additive, to further strengthen the base glass.

Exposing the base glass to the first strengthening molten salt and the additive may be performed at a first temperature and exposing the base glass to the second strengthening molten salt, without exposing the base glass to the additive, may be performed at a second temperature that is lower than the first temperature.

Exposing the base glass to the first strengthening molten salt and the additive may be performed at a temperature within a range of 380° C. to 440° C. and exposing the base glass to the second strengthening molten salt, without exposing the base glass to the additive, may be performed at a temperature within a range of 380° C. to 410° C.

The first strengthening molten salt may include $KNO_3$ and $NaNO_3$ and the second strengthening molten salt may include $KNO_3$.

The method may further include a step of forming a printing layer on an upper surface of the base glass and/or a lower surface of the base glass after having exposed the base glass to the mixed melt.

A method for manufacturing a window includes providing a base glass comprising $SiO_2$, $Al_2O_3$, and $Li_2O$, and exposing the base glass to a mixed melt comprising a strengthening molten salt and an additive. The strengthening molten salt is a mixed salt containing two or more ions selected from the group consisting of $Li^+$, $Na^+$, $K^+$, $Rb^+$ and $Cs^+$, or a single salt containing any one ion selected from the group consisting of $Li^+$, $Na^+$, $K^+$, $Rb^+$ and $Cs^+$. The additive includes $Al_2(SO_4)_3$, $Al(NO_3)_3$, $K_2SiO_3$, $Na_2SiO_3$, KCl, $Ca(NO_3)_2$, and/or $Mg(NO_3)_2$.

The strengthening molten salt may include $KNO_3$ and/or $NaNO_3$ and the additive may include $Al_2(SO_4)_3$ or $Al(NO_3)_3$.

The additive may be included in the mixed melt an amount of 0 wt % to 10 wt % with respect to a total weight of the mixed melt.

A method for manufacturing a window includes providing a base glass. The base glass is exposed to a mixed melt including a first strengthening molten salt and an additive. The base glass, that has been exposed to the mixed melt, is then exposed to a melt including a second strengthening molten salt. The additive includes $Al_2(SO_4)_3$, $Al(NO_3)_3$, $K_2SiO_3$, $Na_2SiO_3$, KCl, $Ca(NO_3)_2$, and/or $Mg(NO_3)$.

The base glass may include $SiO_2$, $Al_2O_3$, and $Li_2O$. The mixed melt may include $Al_2(SO_4)_3$ and $Al(NO_3)_3$, $KNO_3$, and/or $NaNO_3$ and the melt may include $KNO_3$.

The method may further include forming a printing layer on an upper surface of the base glass and/or a lower surface of the base glass after the base glass has been exposed to the melt. The base glass might not be polished after having exposed the base glass to the melt and before forming the printing layer.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
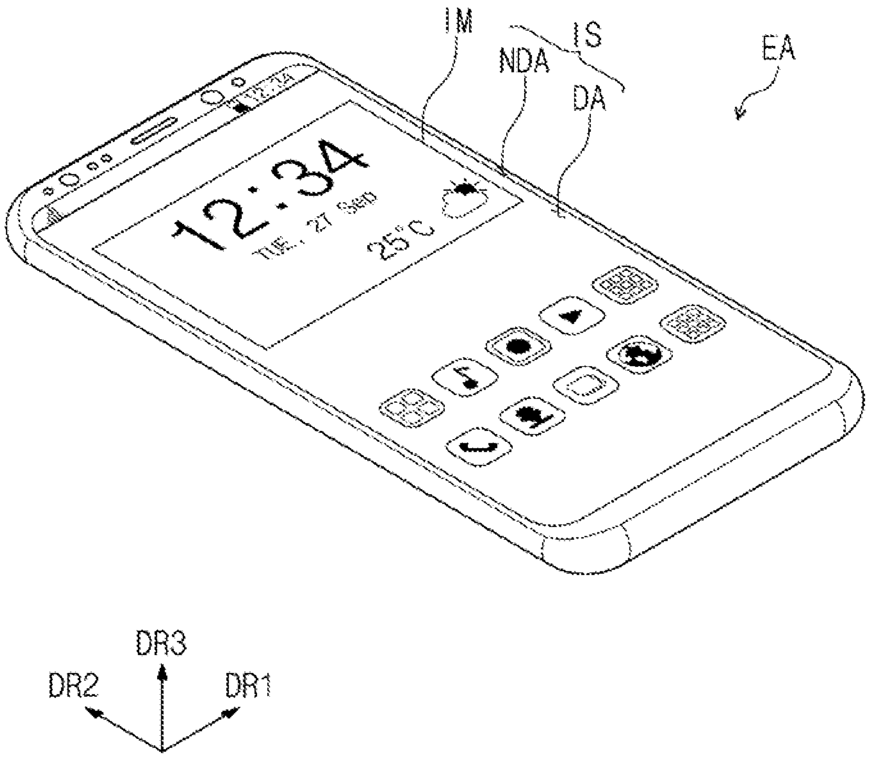
FIG. 1 is a perspective view of an electronic device according to an embodiment.

Embodiments of the present invention described herein may be modified in many alternate forms. It should be understood, however, that the invention it is not necessarily intended to be limited to the particular forms disclosed herein, but rather, the invention is intended to cover all modifications, equivalents, and alternatives falling within the spirit and scope of the present disclosure.

In the present specification, when an element (or a region, a layer, a portion, etc.) is referred to as being "on," "connected to," or "coupled to" another element, it means that die element may be directly disposed on/connected to/coupled to the other element, or that a third element may be disposed therebetween.

Like reference numerals may refer to like elements throughout the figures and the detailed description thereof. Also, in the drawings, the thickness, the ratio, and the dimensions of elements may be exaggerated for an effective description of technical contents.

The term "and/or," includes all combinations of one or more of which associated configurations may define.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Figure 2:
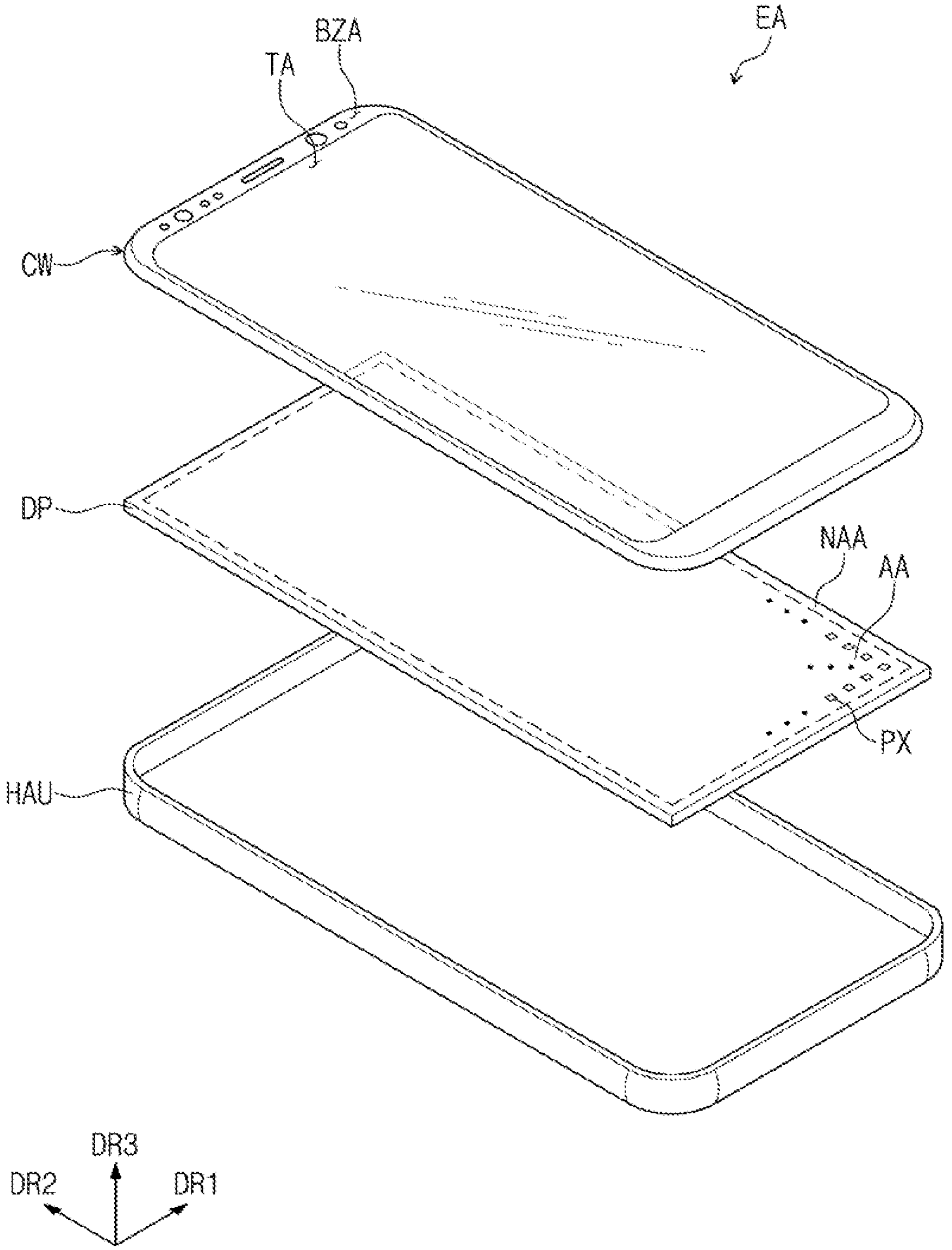
FIG. 2 is an exploded perspective view of the electronic device illustrated in FIG. 1.
Figure 3:
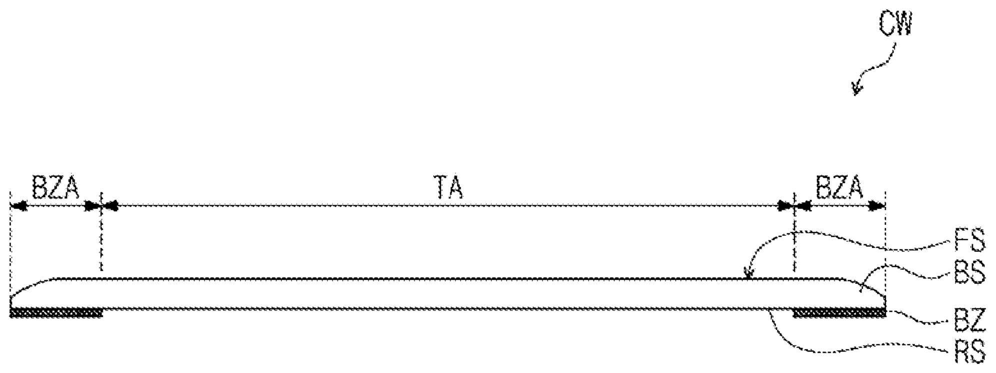
FIG. 3 is a cross-sectional view showing a window according to an embodiment.

Hereinafter, embodiments of the present invention will be described with reference to the accompanying drawings. FIG. 1 is a perspective view showing an electronic device. FIG. 1 is a view showing an embodiment of an electronic device including a window manufactured using a method for manufacturing a window according to an embodiment. FIG. 2 is an exploded perspective view of the electronic device illustrated in FIG. 1. FIG. 3 is a cross-sectional view of a window manufactured using a method for manufacturing a window according to an embodiment.

An electronic device EA may be a device activated in response to electrical signals. The electronic device EA may include various embodiments. For example, the electronic device EA may include a tablet, a laptop, a computer, a smart television, etc. In the present embodiment, the electronic device EA is illustratively presented as a smartphone.

The electronic device EA may display an image IM in a direction of a third directional axis DR3 on a display surface IS parallel to a plane defined by a first directional axis Dill and a second directional axis DR2. The display surface IS on which the image IM is displayed may correspond to a front surface of the electronic device EA and may correspond to an upper surface FS of a window CW. In addition, the electronic device EA may have a three-dimensional shape with a predetermined thickness in the direction of the third directional axis DR3, which is a direction perpendicular to a plane defined by the first directional axis DR1 and the second directional axis DR2.

Meanwhile, in the electronic device EA of an embodiment illustrated in FIG. 1, the display surface IS may include a display area DA and a non-display area NDA adjacent to the display area DA. The non-display area NDA is illustrated to be disposed surrounding the display area DA, but the embodiment is not necessarily limited thereto. The display area DA is a portion in which the image IM is provided and may be a portion corresponding to an active area AA of an electronic panel DP. Meanwhile, the image IM may include still images as well as dynamic images. FIG. 1 illustrates an internet search window as an example of the image IM.

In the present embodiment, an upper surface (or a from surface) and a lower surface (or a rear surface) of respective members are defined with respect to a direction in which the image IM is displayed. The upper surface and the lower surface may oppose each other with respect to the third directional axis DR3 and a normal direction of each of the upper and lower surfaces may be parallel to the third directional axis DR3. Meanwhile, the directions indicated by the first to third directional axes DR1, DR2, and DR3 are relative concepts, and may thus be changed to other directions. Hereinafter, first to third directions correspond to directions indicated by the first to third directional axes DR1, DR2, and DR3, respectively, and are given the same reference numerals.

The electronic device EA includes a window CW, an electronic panel DP, and a housing HAU. In the electronic device EA according to an embodiment illustrated in FIGS. 1 and 2, the window CW and the housing HAU may combine together to form an exterior of the electronic device EA.

The upper surface FS of the window CW, as described above, defines an upper surface of the electronic device EA.

The upper surface FS of the window CW may include a transmission area TA and a bezel area BZA.

The transmission area TA may be an optically transparent area. For example, the transmission area TA may be an area having a visible light transmittance of about 90% or greater.

The bezel area BZA may be an area having a lower light transmittance than the transmission area TA. The bezel area BZA nay define a shape of the transmission area TA. The bezel area BZA may be adjacent to the transmission area TA and may surround the transmission area TA.

The bezel area BZA may have a predetermined color. The bezel area BZA may cover a peripheral area NAA of the electronic panel DP to prevent the peripheral area NAA from being viewed from the outside. Meanwhile, this is illustrated as an example, and in the window CW according to an embodiment of the present invention, the bezel area BZA may be omitted.

The window CW may include a glass substrate. For example, the window CW may include a strengthened glass substrate subjected to a strengthening treatment. The window CW may provide the transmission area TA by using the light transmittance of the glass, and may stably protect the electronic panel DP from external shocks by including the strengthened surface.

The window CW may be manufactured using a method for manufacturing a window according to an embodiment. The method for manufacturing a window according to an embodiment includes a strengthening step of strengthening a base glass, and in the strengthening step, a mixed melt containing a strengthening molten salt and an additive different from the strengthening molten salt may be provided to the base glass. A detailed description of the method for manufacturing a window according to an embodiment will be described later.

The electronic panel DP may be a device activated in response to electrical signals. In the present embodiment, the electronic panel DP is activated to display an image IM on a display surface IS of the electronic device EA. The image IM is provided to users through the transmission area TA, and the users may receive information through the image IM. However, this is illustrated as an example, and the electronic panel DP may be activated to detect external inputs applied to the upper surface thereof. The external inputs may include a user's touch, contact or proximity of intangible objects, pressure, light, or heat, and are not necessarily limited to any one embodiment.

For example, the electronic panel DP may include an active area AA and a peripheral area NAA. The active area AA may be an area providing the image IM. The transmission area TA may overlap at least a portion of the active area AA.

The peripheral area NAA may be an area covered by the bezel area BZA. The peripheral area NAA is adjacent to the active area AA. The peripheral area NAA may surround the active area AA. A driving circuit or driving wiring for driving the active area AA may be disposed in the peripheral area NAA.

The electronic panel DP may include a plurality of pixels PX. The pixels PX display light in response to electrical signals. The light displayed by the pixels PX makes the image IM. The pixels PX may include a display element. For example, the display element may be an organic light emitting element, a quantum dot light emitting element, a liquid crystal capacitor, an electrophoretic element, or an electrowetting element.

The housing HAU may be disposed below the electronic panel DP. The housing HAU may include a material having relatively high rigidity. For example, the housing HAU may include a plurality of frames and/or plates formed of glass, plastic, or metal. The housing HAU provides a predetermined place for accommodation. The electronic panel DP may be accommodated in the accommodation place and thus protected from external shocks.

FIG. 3 is a cross-sectional view of a window according to an embodiment. Referring to FIG. 3, the window CW may include a strengthened glass substrate BS and a printing layer BZ. The strengthened glass substrate BS may be optically transparent. In the present embodiment, the strengthened glass substrate BS may refer to the base glass BG (FIG. 5) alter being strengthened. In the present specification, a strengthened glass substrate BS described herein refers to the base glass BG (FIG. 5) strengthened in a strengthening step of the method for manufacturing a window.

An upper surface FS of the strengthened glass substrate BS is exposed to the outside of the electronic device EA, and defines an upper surface FS of the window CW and an upper surface of the electronic device EA. A lower surface RS of the strengthened glass substrate BS faces the upper surface FS in a direction of the third directional axis DR3.

The printing layer BZ may be disposed on the lower surface RS of the strengthened glass substrate BS to define the bezel area BZA. The printing layer BZ may have a lower light transmittance than the strengthened glass substrate BS. For example, the printing layer BZ may have a predetermined color. Accordingly, the printing layer BZ may selectively transmit/reflect only light of a specific color. Alternatively, for example, the printing layer BZ may be a light blocking layer absorbing incident light. The light transmittance and color of the printing layer BZ may be variously provided according to types and designs of the electronic device EA.

The printing layer BZ may be formed on the lower surface RS of the strengthened glass substrate BS through printing or deposition. In this case, the printing layer BZ may be directly formed on the lower surface RS of the strengthened glass substrate BS. Alternatively, the printing layer BZ may be bonded to the lower surface RS of the strengthened glass substrate BS through a separate adhesive member, etc. In this case, the adhesive member may contact the lower surface RS of the strengthened glass substrate BS.

Figure 4:
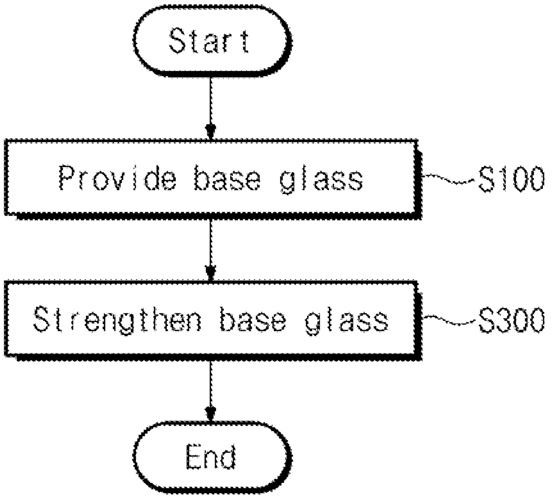
FIG. 4 is a flowchart of a method for manufacturing a window according to an embodiment.

FIG. 4 is a flowchart of a method for manufacturing a window according to an embodiment. The method for manufacturing a window according to an embodiment may include a step S100 of providing a base glass and a step S300 of strengthening the base substrate with providing a mixed melt to the base glass.

In the method for manufacturing a window according to an embodiment, the base glass provided in the step S100 of providing a base glass may be manufactured through a float process. In addition, the provided base glass may be manufactured through a down draw process method or a fusion process method. However, the embodiment is not necessarily limited thereto, and the provided base glass may be manufactured through various methods which are not illustrated as an example.

The base glass provided in the step S100 of providing a base glass may be cut before the strengthening step S300 for intended use. However, the embodiment is not necessarily limited thereto, and the provided base glass may be provided in a size that is not consistent with a size of a finally applied product, and then processed by being cut to a size applied to a final product after the window manufacturing process of an embodiment.

The base glass may be flat. In addition, the base glass may be bent. For example, the base glass cut and provided based on the size of the finally applied product may be bent convex or concave with respect to a central portion. Alternatively, the base glass may include a portion bent in an outer portion. However, the embodiment is not necessarily limited thereto, and the base glass may be provided in various shapes.

The base glass provided in the step S100 of providing a base glass may include $SiO_2$ and $Al_2O_3$. In addition, in an embodiment, the base glass may contain $SiO_2$, $Al_2O_3$, and $Li_2O$. For example, the base glass may contain $SiO_2$ in an amount of 50 wt % to 80 wt %, $Al_2O_3$ in an amount of 10 wt % to 30 wt %, and $Li_2O$ in an amount of 3 wt % to 20 wt %.

In an embodiment, the base glass may contain $SiO_2$, $Al_2O_3$, $Li_2O$, and $P_2O_5$. In addition, in an embodiment, the base glass may contain $SiO_2$, $Al_2O_3$, and $P_2O_5$, and might not contain $Li_2O$. Meanwhile, the base glass may further include at least one of $Na_2O$, $K_2O$, MgO, and CaO in addition to $SiO_2$, $Al_2O_3$, $Li_2O$, and $P_2O_5$.

The strengthening step S300 may be a step of chemically strengthening the base glass with providing a mixed melt to the base glass. For example, the strengthening step S300 may be a step of immersing the base glass in the mixed melt to strengthen a surface of the base glass through an ion exchange method. The mixed melt provided to the base glass may include a strengthening molten salt and an additive. The additive may be different from the strengthening molten salt.

The strengthening step S300 through the ion exchange method may be performed by exchanging alkali metal ions having a relatively smaller ionic radius on the surface of the base glass for alkali metal ions having a larger ionic radius. For example, surface strengthening may be achieved by exchanging ions such as $Li^+$ or $Na^+$ on the surface of the base glass for ions such as $Na^+$ or $K^+$ provided from the strengthening molten salt, respectively. The window manufactured through the strengthening step S300 may include a compressive stress layer CSL (FIG. 9) on the surface thereof. The compressive stress layer CSL (FIG. 9) may be formed on at least one of the upper surface FS and the lower surface RS of the window CW.

The strengthening molten salt provided as a mixed melt in the strengthening step S300 may be a mixed salt or a single salt. The mixed salt may be a molten salt containing at least two ions selected from the group consisting of $Li^+$, $Na^+$, $K^+$, $Rb^+$ and $Cs^+$. In addition, the single salt may be a molten salt containing any one ion selected from the group consisting of $Li^+$, $Na^+$, $K^+$, $Rb^+$, and $Cs^+$. For example, the strengthening step of the method for manufacturing a window according to an embodiment may include a molten salt of $KNO_3$ and $NaNO_3$ as a mixed salt, and a molten salt of $KNO_3$ as a single salt.

The additive included in the mixed melt may contain at least one of $Al_2(SO_4)_3$, $Al(NO_3)_3$, $K_2SiO_3$, $Na_2SiO_3$, KCl, $Ca(NO_3)_2$, and $Mg(NO_3)_2$. For example, the additive may be at least any one selected from $Al_2(SO_4)_3$, $Al(NO_3)_3$, $K_2SiO_3$, $Na_2SiO_3$, KCl, $Ca(NO_3)_2$, and $Mg(NO_3)_2$. For example, in an embodiment, the mixed melt may contain $Al_2(SO_4)_3$ or $Al(NO_3)_3$ as an additive.

The additive may be provided together with the strengthening molten salt in the strengthening step S300. The additive may be contained in an amount of greater than 0 wt % to 10 wt % with respect to a total weight of the mixed melt containing the additive and the strengthening molten salt. In the strengthening step S300, the surface durability of the window may be increased by including an additive in an amount of greater than 0 wt % in the mixed melt. For example, when the additive is added in the strengthening step, damage to the window surface caused in the surface strengthening step using the strengthening molten salt may be minimized. In addition, when the additive is included in the mixed melt in an amount of greater than 10 wt % in the strengthening step S300, ion exchanges between the ions of the strengthening molten salt and the ions on the surface of the base glass may be reduced, thereby deteriorating strengthening properties.

Figure 5:
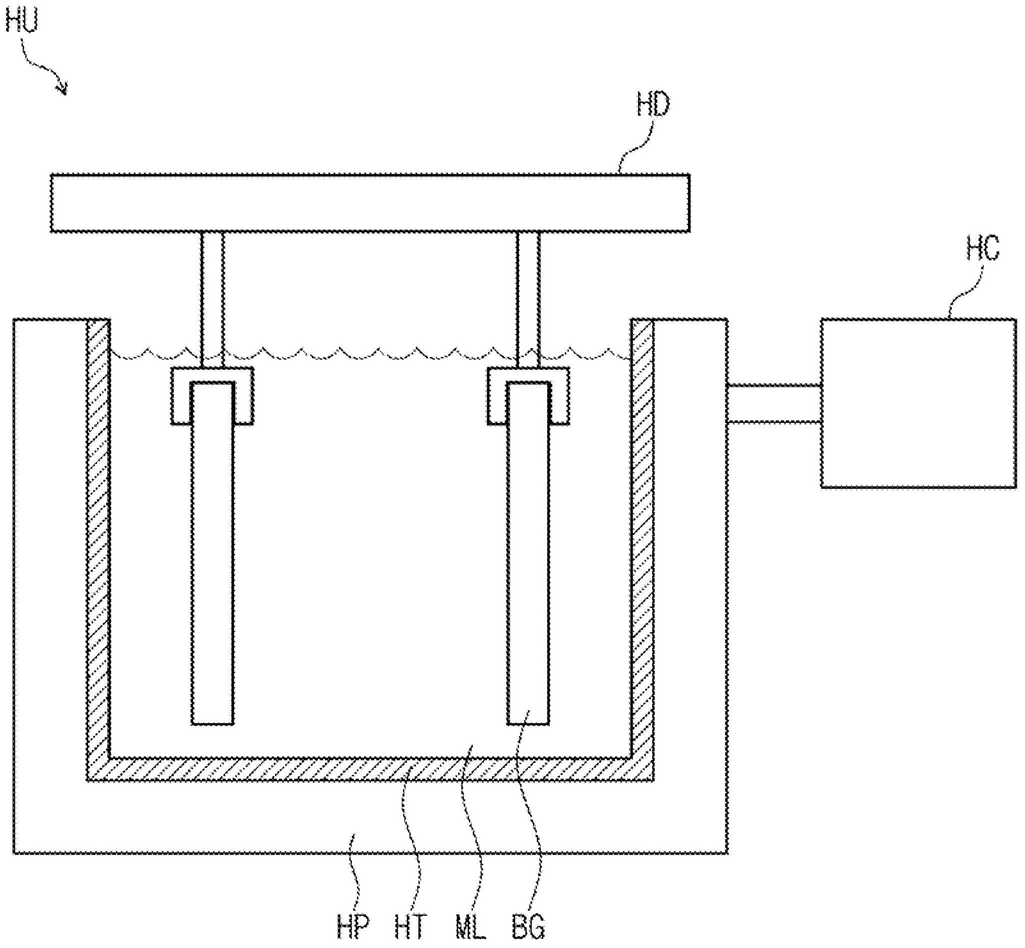
FIG. 5 is a schematic diagram showing a strengthening step in a method for manufacturing a window according to an embodiment.

The strengthening step S300 may be performed by providing the mixed melt to the base glass at high temperature. FIG. 5 schematically shows a strengthening step S300 of providing a mixed melt to strengthen a base glass in the method for manufacturing a window according to an embodiment.

In FIG. 5, a strengthening treatment unit HU in which the strengthening step S300 is performed is illustrated as an example. The strengthening treatment unit HU of FIG. 5 is schematically illustrated to describe the strengthening step S300, and the form of the strengthening treatment unit HU is not necessarily limited to the one shown in FIG. 5.

Referring to FIG. 5, the strengthening step S300 may be performed by immersing a base glass BG in a mixed melt ML in the strengthening treatment unit HU. In this case, the mixed melt ML may contain at least one of the strengthening molten salt and the additives described above.

In the illustration of FIG. 5, the strengthening treatment unit HU may include a tank HT containing the molten mixed melt ML, a heating part HP disposed surrounding die tank HT and applying heat to the mixed melt ML in the tank HT, a driving part HD fixing the base glass BG and vertically moving the base glass BG to immerse the provided base glass BG in the mixed melt ML, and a control part HC controlling the operation of the strengthening treatment unit HU. The control pan HC may control the temperature of the mixed melt ML contained in the tank HT. For example, the central part HC may control the heating pan HP to heat the mixed melt ML at a predetermined temperature and keep the temperature of the mixed melt ML at the heated temperature. For example, the heating part HP may serve to provide heat to heat the mixed melt ML, or serve as a heat insulator to keep the temperature of the healed mixed melt ML. The base glass BG may be disposed to be entirely immersed in the mixed melt ML.

Meanwhile, in FIG. 5, only two pieces of base glass BG fixed to the driving part HD and processed in the mixed melt ML are illustrated, but this is presented as an example and the embodiment is not necessarily limited thereto. The base glass BG processed in the mixed melt ML may be one or a plurality of pieces.

The step S300 of strengthening a base glass may be performed as one strengthening step. In addition, unlike the one above, the strengthening step S300 may be divided into a plurality of steps, and the strengthening step S300 of chemically strengthening a base glass may be performed as a multi-stage strengthening step.

Meanwhile, when the strengthening step S300 is performed as a multi-stage strengthening step, configurations of the strengthening molten salts used in each strengthening step may be different. However, the embodiment is not necessarily limited thereto, and the configurations of the strengthening molten silts used in each strengthening step may lie die same or may be different in configurations of some molten salts.

Figure 6:
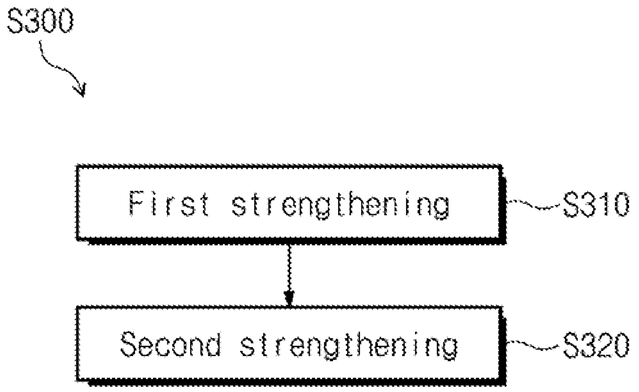
FIG. 6 is a flowchart showing a strengthening step in a method for manufacturing a window according to an embodiment.

FIG. 6 schematically shows a case in which the strengthening step S300 of strengthening a base glass is performed as a multi-stage strengthening step. Referring to FIG. 6, the strengthening step S300 may include a first strengthening step S310 and a second strengthening step S320 that are sequentially performed.

When the strengthening step S300 is performed as a multi-stage strengthening step, the first strengthening step S310 may be a step of strengthening the base glass with providing a strengthening molten salt and an additive to the base glass. In addition, the second strengthening step S320 may be a step of strengthening the base glass with providing a strengthening molten salt without an additive to strengthen the base glass.

The first strengthening step S310 may be a step of providing a mixed melt containing a first strengthening molten salt and an additive to the base glass to strengthen the base glass, and for example, the first strengthening molten salt may contain $KNO_3$ and $NaNO_3$. The second strengthening step S320 is performed after the first strengthening step S310, and may be a step of providing a melt containing the second strengthening molten salt without an additive to the base glass strengthened in the first strengthening step to further strengthen the base glass. For example, the second strengthening molten salt may contain $KNO_3$ and might not contain $NaNO_3$. The first strengthening molten salt and the second strengthening molten salt may be different from each other, or when the first strengthening molten salt and the second strengthening molten salt include a plurality of molten salts, at least some of the molten salts may be the same.

When the strengthening step S300 is performed as a multi-stage strengthening step, the first strengthening step S310 may be performed at a first temperature and tire second strengthening step S320 may be performed at a second temperature. For example, the strengthening step S300 may include the first strengthening step S310 of performing an ion exchange treatment at the first temperature and the second strengthening step S320 of performing an ion exchange treatment at the second temperature. The first temperature may be 380° C. to 440° C., and the second temperature may be 380° C. to 410° C. For example, the first strengthening step S310 may be performed at the first temperature of 380° C. to 440° C. for 2 to 5 hours, and the second strengthening step S320 may be performed at the second temperature of 380° C. to 410° C. for 30 minutes to 2 hours.

Meanwhile, in the method for manufacturing a window according to an embodiment, the second temperature of the second strengthening step S320 may be equal to or lower than the first temperature of the first strengthening step S310. For example, when the base glass provided in the method for manufacturing a window according to an embodiment contains $SiO_2$, $Al_2O_3$, and $Li_2O$, the first strengthening step S310 may be performed at 420° C. for 2 hours, and then the second strengthening step S320 may be performed at 390° C. for 45 minutes.

Figure 7:
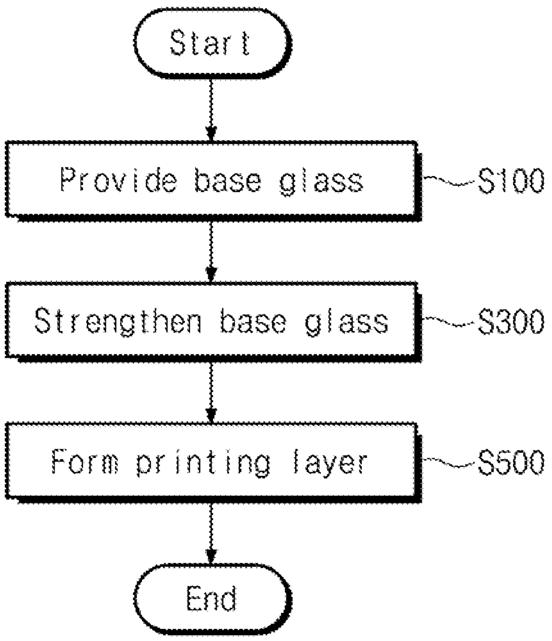
FIG. 7 is a flowchart of a method for manufacturing a window according to an embodiment.

FIG. 7 is a flowchart of a method for manufacturing a window according to an embodiment. The method for manufacturing a window according to an embodiment may include a step S100 of providing a base glass and a step S300 of strengthening the base glass, and a step S500 of forming a printing layer or the strengthened base glass.

The printed layer formed in the step S500 of forming a printing layer may be provided on at least one of the upper and lower surfaces of the strengthened base glass. The printing layer may be a printing layer BZ providing the bezel area BZA described in FIG. 3. In the step S500 of forming a printing layer, the printing layer BZ may be, for example, provided on the lower surface RS (FIG. 3) of the strengthened glass substrate BS (FIG. 3), which is a strengthened base glass.

Figure 8:
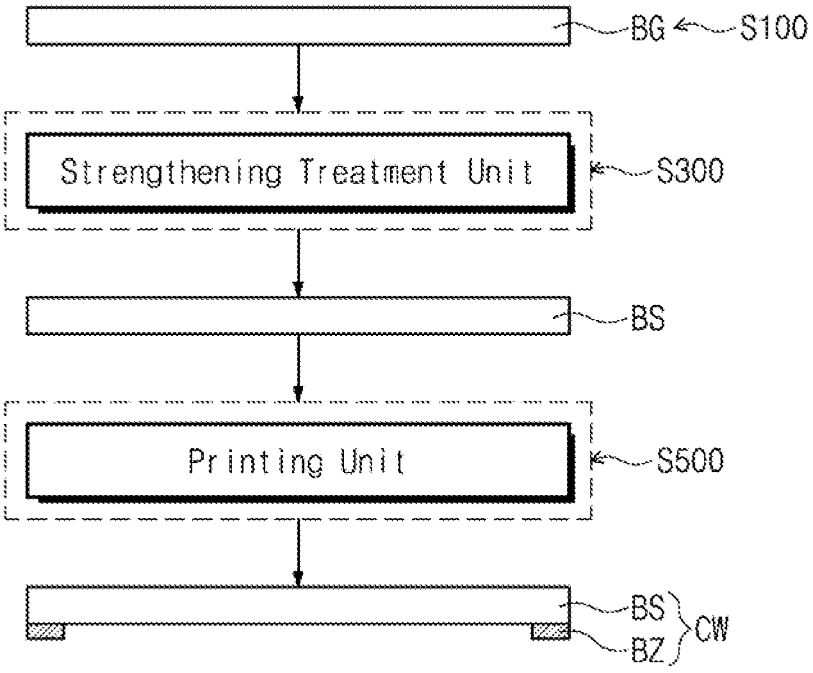
FIG. 8 is a block diagram schematically showing a method for manufacturing a window according to an embodiment.

FIG. 8 is a block diagram schematically showing a method for manufacturing a window according to an embodiment. In FIG. 8, each unit performing the step S100 of providing a base glass BG, the strengthening step S300 of strengthening the provided base glass BG, and the printing layer forming step S500 of forming a printing layer on the strengthened glass substrate BS, which correspond to each step in the flowchart of FIG. 7 is indicated as a block. The base glass BG is provided to a strengthening treatment unit, and the strengthened glass substrate BS after chemically strengthened in the strengthening treatment unit is transferred to a printing unit. After a printing layer is formed in the printing unit, a window CW including the strengthened glass substrate BS and the printing layer BZ may be provided in the end.

Meanwhile, although not shown in the drawing, between the strengthening step S300 and the printing layer forming step S500, a cooling step of cooling the strengthened glass substrate BS, a cleaning step of cleaning the strengthened glass substrate BS, etc. may be further included, and accordingly, a cooling unit, a cleaning unit, etc. may be further included between the strengthening treatment unit and the printing unit.

Figure 9:
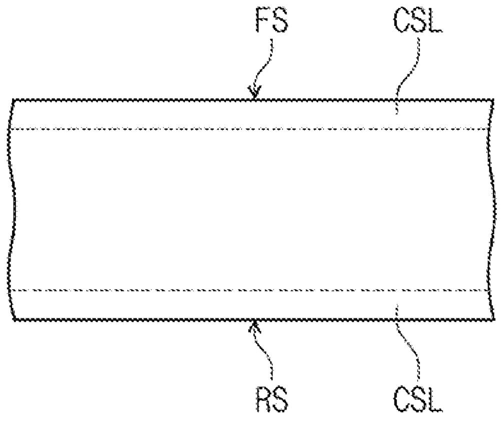
FIG. 9 is a cross-sectional view showing a portion of a window according to an embodiment.

FIG. 9 is a cross-sectional view showing a portion of a window manufactured using the method for manufacturing a window according to an embodiment. FIG. 9 may be a cross-sectional view showing the area AA of FIG. 3. The compressive stress layer CSL may be formed on a surface of a window manufactured using the method for manufacturing a window according to an embodiment. The compressive stress layer CSL may be defined as a layer from the upper surface FS or the lower surface RS of the window to a point at which a compressive stress CS value becomes zero.

Meanwhile, the window manufactured using the method for manufacturing a window according to an embodiment may include the compressive stress layer CSL formed adjacent to the upper surface FS and the lower surface RS, and the surface of the window defining the upper surface FS and the lower surface RS may be provided without damage even after the strengthening step S300.

For example, the method for manufacturing a window according to an embodiment includes an additive together with a strengthening molten salt in the strengthening step to strengthen the base glass, thereby minimizing a decrease in the compressive stress values of the compressive stress layer on the window surface to provide a window having increased surface durability. For example, the window manufactured using the method for manufacturing a window according to an embodiment includes an additive in the strengthening step to strengthen the base glass, thereby minimizing defects on the surface of the manufactured window or voids that may be formed due to vacancies of ions escaping from the inside of the base glass during the strengthening step to exhibit excellent chemical resistance and increased surface strength as well.

In addition, in the method for manufacturing a window according to an embodiment, when the base glass is strengthened by including additives in the strengthening step, defects on the window surface may be minimized, and a uniform window surface may thus be provided even when a separate post-processing process tor improving window surface properties is skipped. In addition, accordingly, when a priming layer is formed on the window surface, the priming quality of the printing layer may be well kept.

Figure 10:
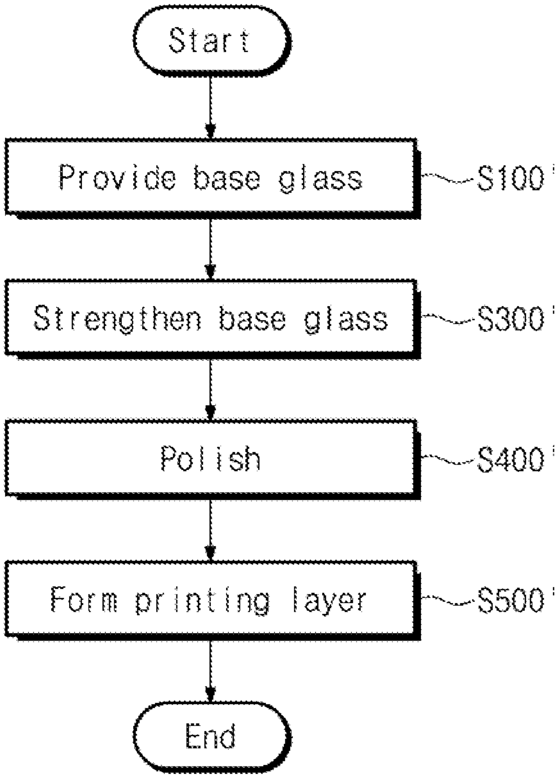
FIG. 10 is a flowchart showing a comparative method for manufacturing a window.

FIG. 10 is a flowchart showing a conventional method for manufacturing a window. The conventional method for manufacturing a window may include a step S100' of providing a base glass, a step S300' of strengthening the base glass, a step S400' of performing a polishing treatment, and a step S500' of forming a printing layer. For example, the conventional method for manufacturing a window is different from the steps of the method for manufacturing a window according to an embodiment in that the conventional method further includes the polishing treatment step S400' after the strengthening step S300'.

Meanwhile, in the conventional method for manufacturing a window, the step S300' of strengthening the base glass may be a step of providing a strengthening molten salt to the base glass to chemically strengthen the base glass. For example, in the step S300' of strengthening the base glass according to the conventional method for manufacturing a window, there is a difference in that when the base glass is chemically strengthened using a strengthening molten salt, the additives suggested in die method for manufacturing a window according to an embodiment are not included.

Figure 11:
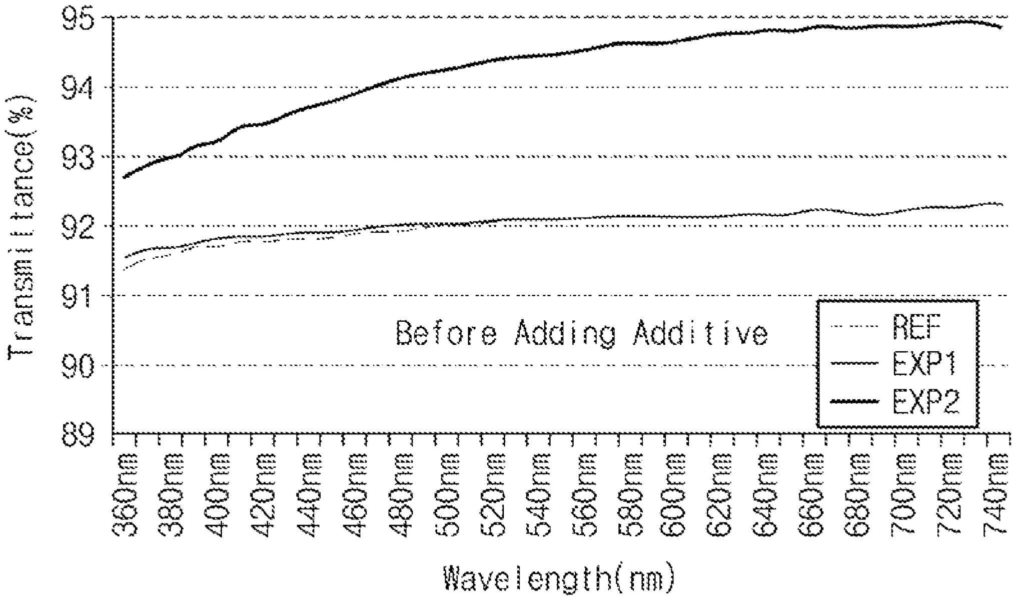
FIG. 11 is a graph evaluating chemical resistance of a window manufactured by being strengthened using a comparative strengthening step.
Figure 12A:
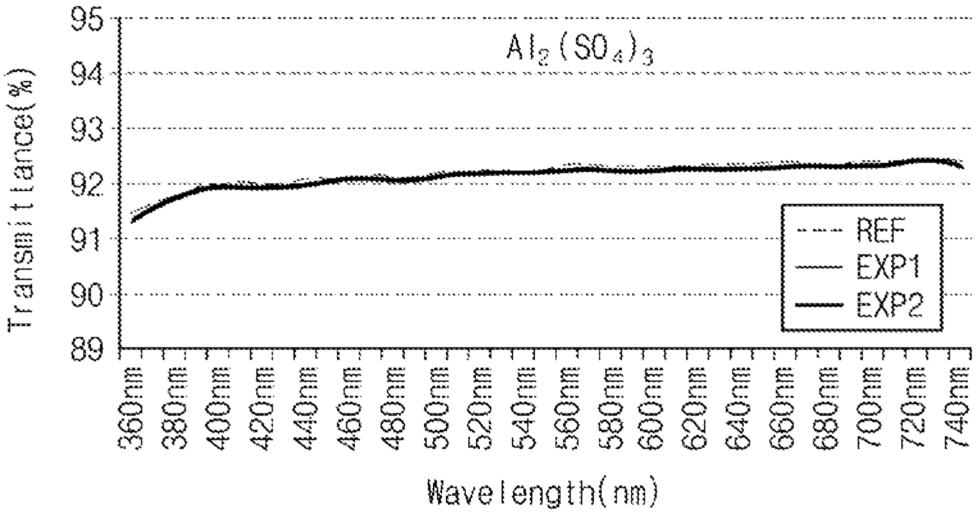
FIGS. 12*a* to 12*f* are graphs evaluating chemical resistance of windows manufactured using a method for manufacturing a window according to an embodiment.

Hereinafter. FIGS. 11 and 12*a* to 12*f* are graphs showing results of chemical resistance evaluation for manufactured windows. FIG. 11 shows results of chemical resistance evaluation for a window manufactured using the conventional method for manufacturing a window, and FIGS. 12*a* to 12*f* show results of chemical resistance evaluation for Example windows manufactured using the method for manufacturing a window according to an embodiment. FIG. 12*a* is a case of a strengthening treatment including $Al_2(SO_4)_3$ as an additive, FIGS. 12*b*, 12*c*, 12*d*, 12*e*, and 12*f* slow results of chemical resistance evaluation for windows strengthened by including $Al(NO_3)_3$, $K_2SiO_3$, $Ca(NO_3)_2$, KCl, and $Mg(NO_3)_2$ as an additive, respectively. In the windows manufactured for the results of chemical resistance evaluation shown in FIGS. 12*a* to 12*f*, the additives were contained in an amount of 6 wt % in the mixed melt provided to the base glass.

In FIGS. 11 and 12*a* to 12*f*, "REF" is a graph showing transmittance values for each wavelength of windows before acid treatment after being manufactured. In addition, In FIGS. 11 and 12*a* to 12*f*, "EXP1" indicates transmittance values for each wavelength after acid treatment by immersing the manufactured windows in a nitric acid ($HNO_3$) solution having a pH of 1 or less at 50 for 2 minutes, and "EXP2" indicates transmittance values for each wavelength after acid treatment by immersing the manufactured windows in a nitric acid ($HNO_3$) solution a pH of 1 or less at 60 for 2 minutes. Meanwhile, in some graphs, the transmittance graphs indicated by "REF", "EXP1", and "EXP2" overlap each other, and this suggests that a difference in transmittance is minute or similar to the conditions displayed by the overlapping graphs.

Meanwhile, in the windows manufactured for evaluation shown in FIGS. 11 and 12*a* to 12*f*, the strengthening step was performed as a multi-stage strengthening step. The first strengthening step included $KNO_3$ and $NaNO_3$, as a strengthening molten salt and was performed at 420° C. for 2 hours, and the second strengthening step included $KNO_3$ as a strengthening molten salt and was performed at 390° C. for 45 minutes. In the window showing the evaluation results in FIG. 11, additives were not included in the strengthening step, and in the windows showing the evaluation results in FIGS. 12*a* to 12*f*, additives each were included in the first strengthening step.

Referring to FIG. 11, when a window is manufactured using the conventional method for manufacturing a window, it is seen that the window transmittance after the acid treatment increased compared to the window transmittance before the acid treatment. This is believed to be due to an increase in the window transmittance when some chemical components were eluted from the window surface during the chemical resistance evaluation called acid treatment, indicating that the physical properties of the window surface changed after the acid treatment.

Referring to FIGS. 12*a* to 12*f*, when a window was manufactured using the method for manufacturing a window according to an embodiment, even after the acid treatment, there was little change in transmittance, or the change in transmittance was smaller than that of the window manufactured using the conventional method for manufacturing a window. This is believed to be due to an increase in chemical durability of the window surface when the strengthening treatment is performed by including an additive together with the strengthening molten salt in the strengthening step.

Figure 12B:
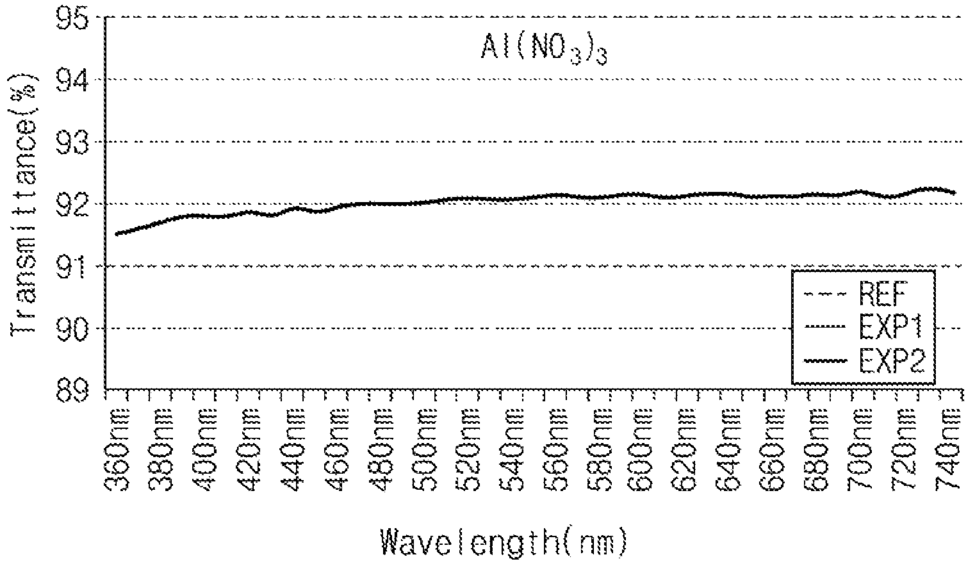
Figure 12C:
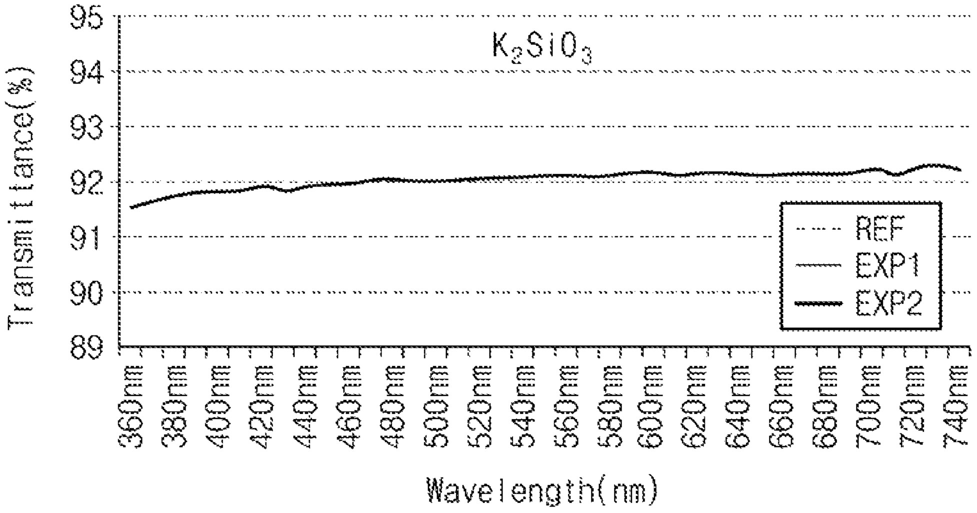
Figure 12D:
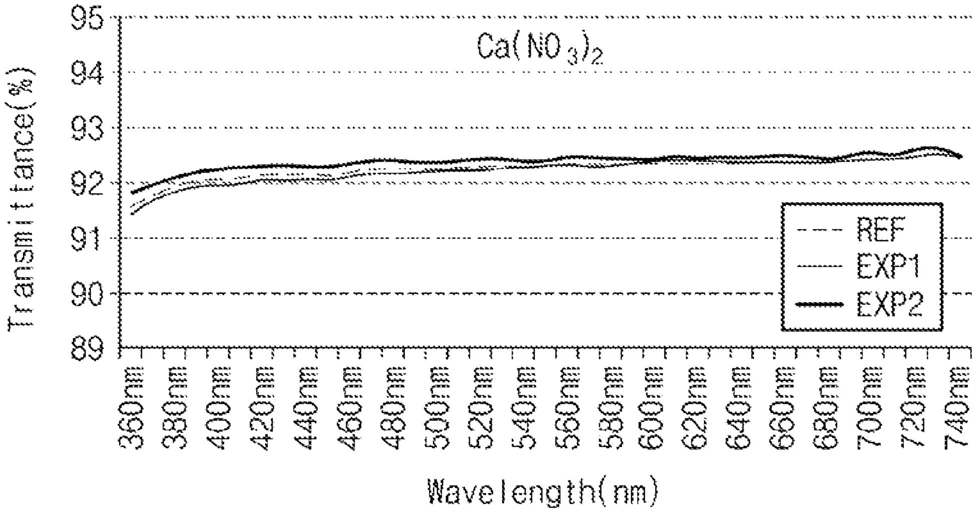
Figure 12E:
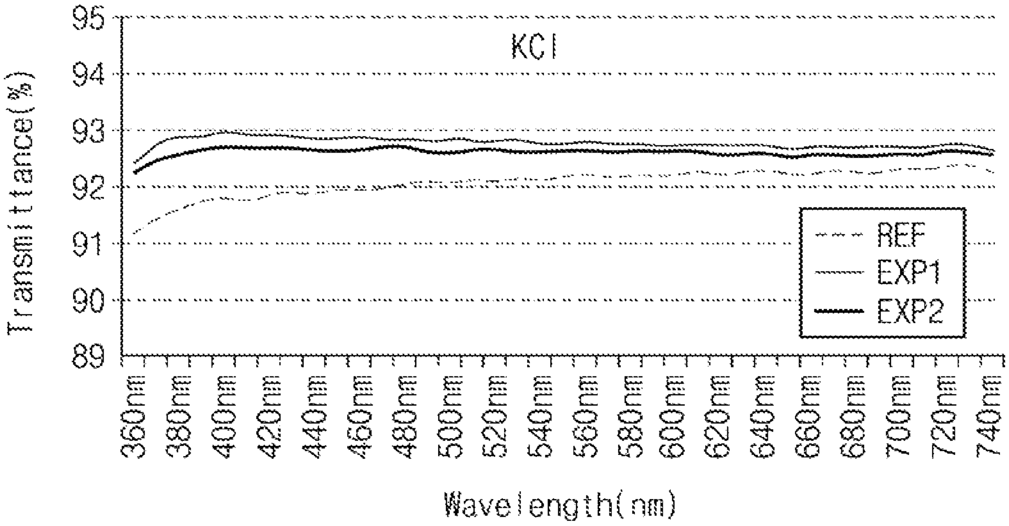
Figure 12F:
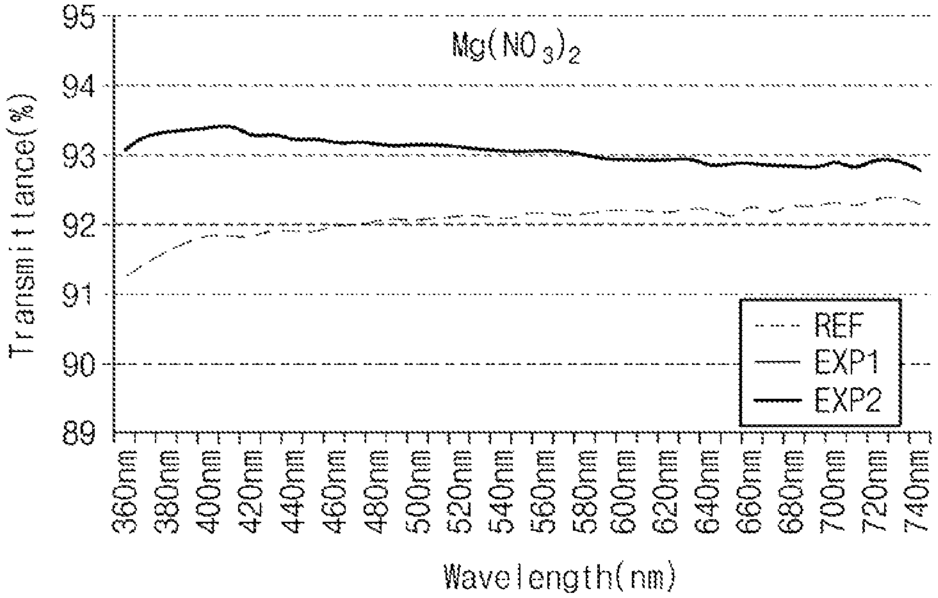

Meanwhile, in FIGS. 12*a* to 12*c*, given that there is little change in transmittance before and after the acid treatment, it is seen that the strengthened window has excellent chemical resistance. For example, it is seen that when the base glass is strengthened by including $Al_2(SO_4)_3$, $Al(NO_3)_3$, or $K_2SiO_3$ as an additive together with the strengthening molten salt during the strengthening step in the method for manufacturing a window according to an embodiment, good surface compressive stress values and excellent surface chemical resistance are shown.

Figure 13:
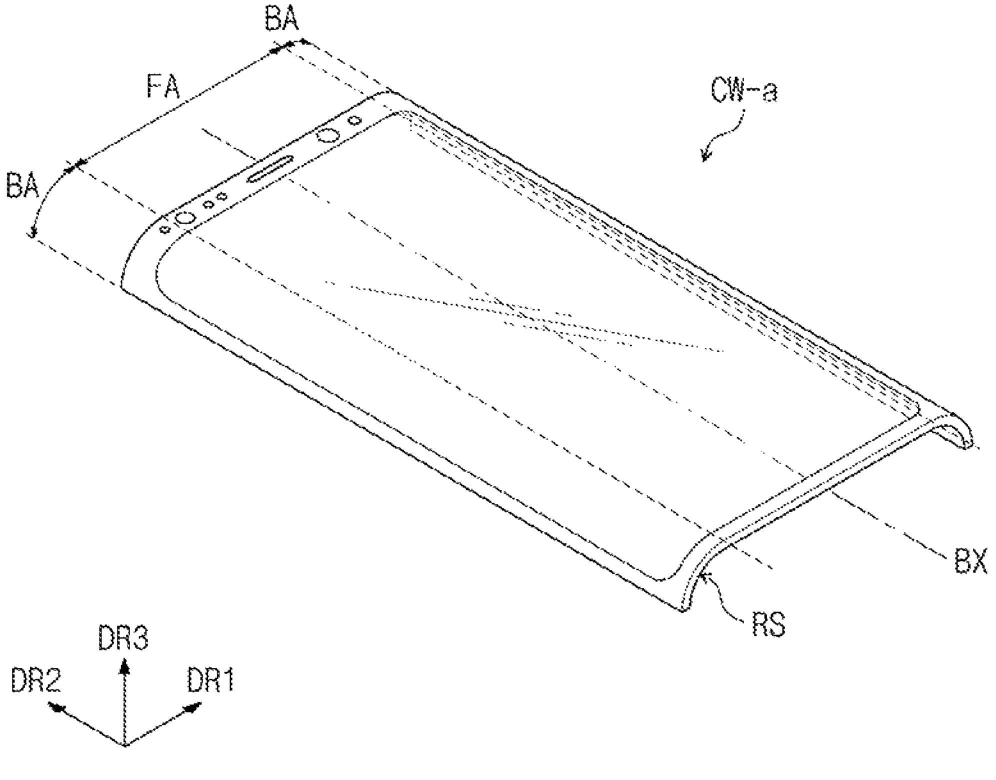
FIG. 13 is a perspective view illustrating a window according to an embodiment.
Figure 14A:
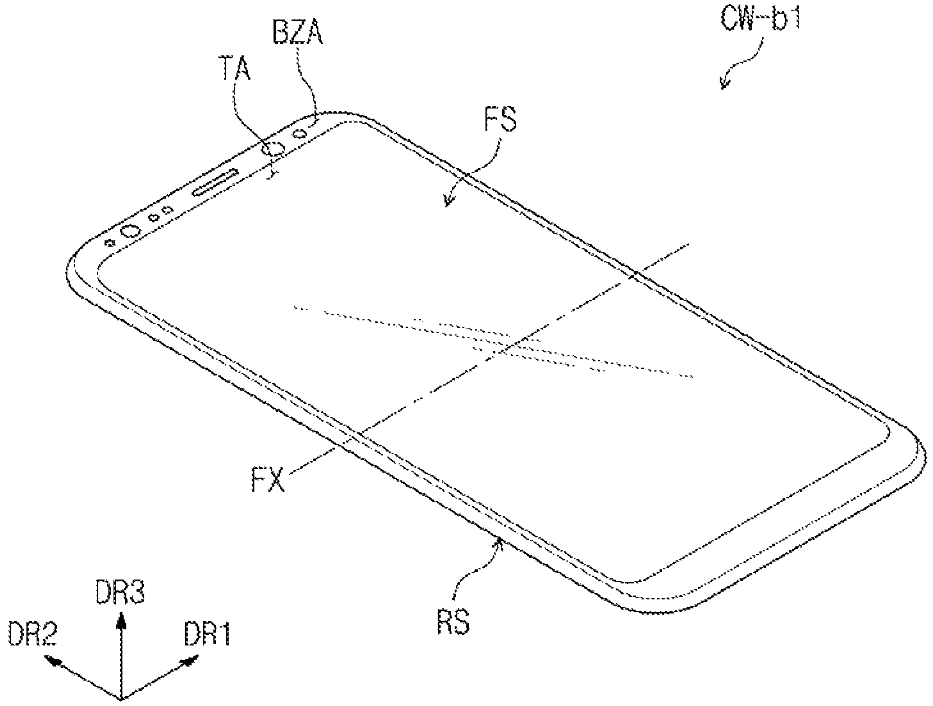
FIGS. 14*a* and 14*b* are perspective views illustrating windows according to an embodiment.
Figure 14B:
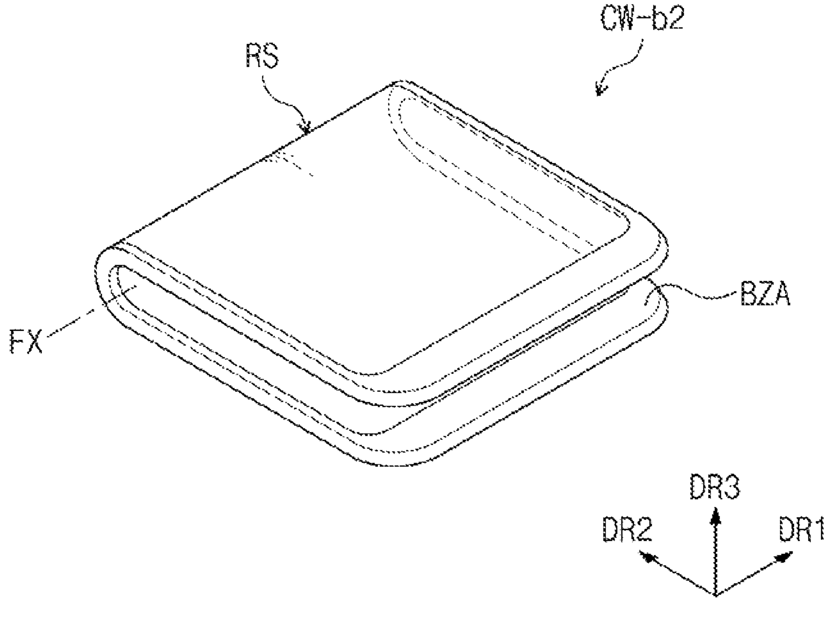

FIG. 13 is a perspective view illustrating a window CW-a manufactured using the method for manufacturing a window according to an embodiment of the present invention. FIGS. 14*a* and 14*b* are perspective vie vs illustrating windows CW-b1 and CW-b2 manufactured using the method for manufacturing a window according to an embodiment of the present invention. Hereinafter, in the description of the window described with reference to FIGS. 13 and 14*a* to 14*b*, differences will be mainly described except for the description overlapping the one described in FIGS. 1 to 10.

As illustrated in FIG. 13, the window CW-a may include a bending portion BA bent around a bending axis BX. In an embodiment, the window CW-a may include a flat portion FA and a bending portion BA.

In an embodiment, the bending axis BX may extend along the second directional axis DR2 and may be provided on a rear surface of the window CW-a. The flat portion FA may be a portion parallel to a plane defined by the first and second directional axes DR1 and DR2. The bending portion BA may be a curved portion adjacent to the flat portion FA and having a curved shape. For example, referring to FIG. 13, the bending portion BA is a portion adjacent to both sides of the flat portion FA, and may be a portion bent downwards from the flat portion FA. However, the embodiment is not necessarily limited thereto, and the bending portion BA may be disposed adjacent to only one side of the flat portion FA, or may be disposed adjacent to all four sides of the flat portion FA on a plane.

The window CW-a according to an embodiment includes a base glass strengthened in a mixed melt containing an additive together with a strengthening molten salt, and has good surface compressive stress values and excellent surface chemical resistance without a separate post-processing step after the strengthening step.

In addition, the windows CW-b1 and CW-b2 manufactured the method for manufacturing a window according to an embodiment may be folded or unfolded around a folding axis FX as illustrated in FIGS. 14*a* and 14*b*. For ease of description, the window CW-b1 in an unfolded state is shown in FIG. 14*a* and the window CW-b2 in a folded state is shown in FIG. 14*b*.

The folding axis FX may extend along the first directional axis DR1 and may be defined on an upper surface FS of the window CW-b1. For example, in FIGS. 14*a* to 14*b*, an in-folding window in which a lower surface RS of the window CW-b2 is exposed to the outside when being folded is illustrated, but the embodiment is not necessarily limited thereto. For example, the window according to an embodiment may be a window in which the folding axis FX is defined below the lower surface RS of the window CW-b1 and is out-folded unlike the one shown in FIGS. 14*a* and 14*b*. Meanwhile, the windows CW-b1 and CW-b2 that are modifiable in shape during use may also be manufactured using the method for manufacturing a window according to an embodiment, and go through the strengthening step S300 by including an additive together with the strengthening molten salt in the strengthening step to have good surface compressive stress values and excellent surface chemical resistance without a separate post-processing step after the strengthening step.

The window CW-a having the bending portion BA manufactured using the method for manufacturing a window according to an embodiment or the windows CW-b1 and CW-b2 that are modifiable in shape may exhibit good surface compressive stress values and excellent durability even without the polishing treatment step after the strengthening step, and may thus be applied to various electronic devices.

The method for manufacturing a window according to an embodiment may provide excellent surface chemical resistance and good surface compressive stress characteristics by strengthening a base glass using a mixed melt containing an additive together with a strengthening molten salt in the strengthening step. In addition, the method for manufacturing a window according to an embodiment provides good surface compressive stress characteristics and excellent surface durability even without the polishing treatment step provided after the strengthening step in order to remove surface defects of the strengthened glass substrate, thereby showing increased processability. In addition, the method for manufacturing a window according to an embodiment provides good surface characteristics by strengthening the base glass using a mixed melt containing an additive together with a strengthening molten salt in the strengthening step, and provides enhanced printing quality provided on the surface of the strengthened base glass and increased durability of a printed layer to the surface of the base glass.

Although the present invention has been described with reference to a preferred embodiment of the present invention, it will be understood that the present invention should not be limited to these preferred embodiments but various changes and modifications can be made by those skilled in the art without departing from the spirit and scope of the present invention.

The invention claimed is:

1. A method for manufacturing a window, the method comprising the steps of:

providing a base glass including $K_2O$ and/or CaO;

in a first step, exposing the base glass to a mixed melt comprising a first strengthening molten salt and an additive comprising $Ca(NO_3)_2$ at a first temperature within a range of 380° C. to 440° C., the first strengthening molten salt consisting of $KNO_3$ and $NaNO_3$; and in a second step, exposing the base glass to a second strengthening molten salt consisting of $KNO_3$, wherein the additive is included in the mixed melt an amount of greater than 0 wt % to 10 wt % with respect to a total weight of the $KNO_3$ and $NaNO_3$ and the additive.

2. The method of claim 1, wherein the base glass further comprises $P_2O_5$.

3. The method of claim 1, wherein the base glass comprises:

$SiO_2$ in an amount of 50 wt % to 80 wt %;

$Al_2O_3$ in an amount of 10 wt % to 30 wt %; and $Li_2O$ in an amount of 3 wt % to 20 wt %.

4. The method of claim 1, wherein the base glass comprises $SiO_2$, $Al_2O_3$, and $P_2O_5$.

5. The method of claim 1, wherein:

in the second step, exposing the base glass to the second strengthening molten salt is performed at a second temperature that is lower than the first temperature.

6. The method of claim 5, wherein:

the second temperature is within a range of 380° C. to 410° C.

7. The method of claim 1, further comprising a step of forming a printing layer on an upper surface of the base glass and/or a lower surface of the base glass after having exposed the base glass to the second strengthening molten salt.

8. A method for manufacturing a window, the method comprising:

providing a base glass comprising $SiO_2$, $Al_2O_3$, and $Li_2O$ as well as $K_2O$ and/or CaO; and in a first step exposing the base glass to a mixed melt comprising a first strengthening molten salt and an additive includes $Ca(NO_3)_2$, and/or $Mg(NO_3)_2$ at a first temperature within a range of 380° C. to 440° C., the first strengthening molten salt consisting of $KNO_3$ and $NaNO_3$;

in a second step, exposing the base glass to a second strengthening molten salt consisting of $KNO_3$, wherein the additive is included in the mixed melt an amount of greater than 0 wt % to 10 wt % with respect to a total weight of the $KNO_3$ and $NaNO_3$.

9. The method of claim 8, further comprising forming a printing layer on an upper surface of the base glass and/or a lower surface of the base glass after the base glass has been exposed to the second strengthening molten salt, wherein, the base glass is not polished after having exposed the base glass to the second strengthening molten salt and before forming the printing layer.

10. A method for manufacturing a window, the method comprising the steps of:

providing a base glass including $K_2O$ and/or CaO;

in a first step, exposing the base glass to a mixed melt comprising a first strengthening molten salt and an additive comprising $Mg(NO_3)_2$ at a first temperature within a range of 380° C. to 440° C., the first strengthening molten salt consisting of $KNO_3$ and $NaNO_3$; and in a second step, exposing the base glass to a second strengthening molten salt consisting of $KNO_3$, wherein the additive is included in the mixed melt an amount of greater than 0 wt % to 10 wt % with respect to a total weight of the $KNO_3$ and $NaNO_3$ and the additive.

11. The method of claim 10, wherein the base glass further comprises $P_2O_5$.

12. The method of claim 10, wherein the base glass comprises:

$SiO_2$ in an amount of 50 wt % to 80 wt %;

$Al_2O_3$ in an amount of 10 wt % to 30 wt %; and $Li_2O$ in an amount of 3 wt % to 20 wt %.

13. The method of claim 10, wherein the base glass comprises $SiO_2$, $Al_2O_3$, and $P_2O_5$.

14. The method of claim 10, wherein:

in the second step, exposing the base glass to the second strengthening molten salt is performed at a second temperature that is lower than the first temperature.

15. The method of claim 14, wherein:

the second temperature is within a range of 380° C. to 410° C.

16. The method of claim 10, further comprising a step of forming a printing layer on an upper surface of the base glass and/or a lower surface of the base glass after having exposed the base glass to the second strengthening molten salt.

* * * * *